United States Patent [19]
Whiting et al.

[11] 3,980,604
[45] Sept. 14, 1976

[54] RESIN IMPREGNATION OF SILICEOUS MATERIALS

[76] Inventors: David A. Whiting, 126 E. Fairmount Ave.; Paul R. Blankenhorn, 87 Hilltop Trailer Park; Donald E. Kline, 1210 E. Branch Road, all of State College, Centre County, Pa. 16801

[22] Filed: June 8, 1973

[21] Appl. No.: 368,651

[52] U.S. Cl. .................... 260/30.4 EP; 260/37 EP
[51] Int. Cl.$^2$ .......................................... C08K 5/15
[58] Field of Search ................ 117/54, 123 D, 119, 117/161 ZB; 260/30.4 EP; 428/414, 538

[56] References Cited
UNITED STATES PATENTS

| | | | |
|---|---|---|---|
| 2,083,863 | 6/1937 | Pfeiffer .................... | 117/54 |
| 2,735,829 | 2/1956 | Wiles et al. ............. | 260/30.4 EP X |
| 2,794,752 | 6/1957 | Schmidt ................... | 117/123 |
| 2,943,953 | 7/1960 | Daniel ..................... | 117/161 |
| 2,952,192 | 9/1960 | Nagin ...................... | 117/161 |
| 3,012,487 | 12/1961 | Mika ....................... | 117/123 |
| 3,033,088 | 5/1962 | Wittenwyler .............. | 117/123 |
| 3,145,502 | 8/1964 | Rubenstein ............... | 117/123 D X |
| 3,340,115 | 9/1967 | Rubenstein ............... | 117/123 |
| 3,395,035 | 7/1968 | Strauss .................... | 117/123 D X |
| 3,396,138 | 8/1968 | Weller ..................... | 117/123 D X |
| 3,510,339 | 5/1970 | Wile ........................ | 117/123 |
| 3,591,433 | 7/1971 | Andreassen .............. | 117/123 D X |
| 3,691,512 | 9/1972 | Exner ...................... | 117/123 D X |
| 3,795,533 | 3/1974 | Gauri ...................... | 117/123 D X |
| R27,061 | 2/1971 | Rubenstein ............... | 117/123 |

OTHER PUBLICATIONS

Nace, Technical Committee Report, "Surface Preparation of Concrete for Coating", pp. 84–87, Jan., 1966.
Lee et al.; Handbook of Epoxy Resins; Lee & Neville; McGraw-Hill Book Co./ 1967; pp. 7–10, 7–13.

*Primary Examiner*—Lewis T. Jacobs
*Attorney, Agent, or Firm*—Dos T. Hatfield

[57] ABSTRACT

A process for improving the physical properties and chemical resistance of concrete, brick and like materials by impregnation with an epoxy resin and comprising the steps of
a. drying the material to a moisture level below about 5% by weight,
b. impregnating the dried material under conditions of vacuum and/or pressure with an epoxy resin composition comprising a mixture of an epoxy resin, from about 10 to about 50 parts per one hundred parts of resin of a reactive diluent for epoxy resins, and a curing agent having a substantial pot life, and
c. curing the resin impregnated within the material.
The invention also embodies the epoxy resin-impregnated material so obtained.

5 Claims, 1 Drawing Figure

STRESS STRAIN CURVE FOR EPOXY IMPREGNATED CONCRETE

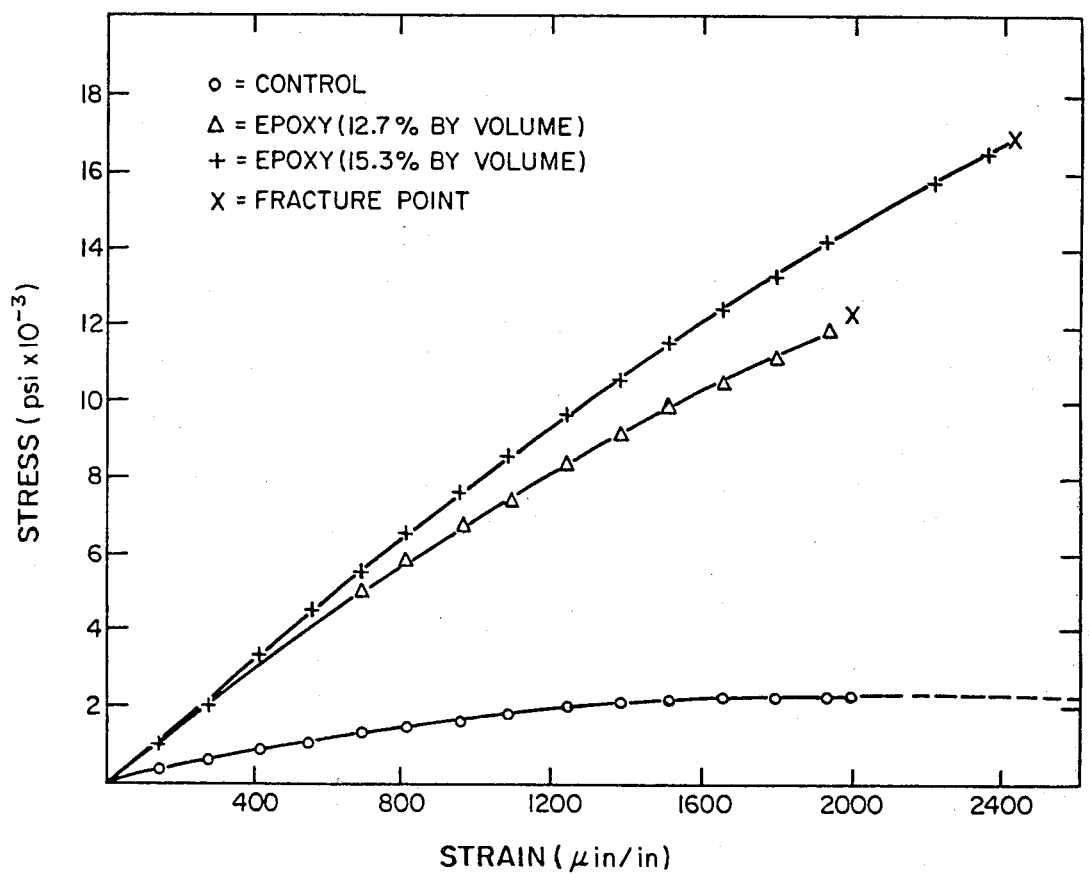

RESIN IMPREGNATION OF SILICEOUS MATERIALS

This invention relates to a method of improving the physical and chemical properties of concrete, brick, stone, and similar materials.

Due to its porous nature, concrete and like materials possess many disadvantages which limit strength and durability. For example, concrete is readily attacked by acid and alkaline media, particularly sulphates and de-icing salts. It also suffers extensive cracking due to freeze-thaw cycling. Thus, the pore system in concrete allows these destructive agents to penetrate into concrete structures and cause damage not only directly to the concrete itself, but also to steel reinforcing bars.

Many workers have attempted to alleviate this problem by filling the pore system with low viscosity monomers, and subsequently polymerizing them in-situ via thermal-catalytic or radiation-induced initiation. The most widely used systems have been methyl methacrylate and styrene. For example, U.S. Pat. No. 2,794,752 dicloses that thermoplastic resins such as methylmethacrylate, polyvinylchloride, polyvinylacetate and the like may be used together with a water soluble silicate to impregnate light-weight concrete in order to improve tensile strength properties. However, such products do not impart much chemical resistance to the concrete and have very high volume shrinkage causing an adverse change in physical properties. Furthermore, monomers used have high volatility and, because polymerization within the pores of the material is not complete, the monomer volatilizes out causing internal strength weaknesses and also surface depletion effecting an irregular surface which does not impart proper protection or improvement. In addition, the toxicity and low flash point of the monomers make handling difficult. Uncured epoxy resins are also known to have been used by Japanese workers to penetrate concrete to a depth of 10 mm, followed by surface cure. This treatment is said to effectively seal the concrete against the penetration of aqueous media.

When using epoxy resins as coatings for concrete and similar materials, penetration of the resin does not occur to any significant extent and thus the physical properties of the surfaced concrete body are not significantly improved and the mechanical properties of the concrete are not changed. In addition, surface coatings of epoxy resins are brittle and tend to crack and break off, leaving an exposed surface. Of interest in this regard is U.S. Pat. No. RE27,061 (D. Rubenstein, reissued Feb. 16, 1971, for original U.S. Pat. No. 3,340,115) which discloses the spraying of an epoxy and other resins on the surface of concrete pipe and thereafter applying a fibrous material to obtain a reinforced laminated construction.

It has now been found that excellent penetration of epoxy resins into siliceous materials such as concrete, brick, clay pipe and other clay products, and the like may be obtained by the combined use of a reactive epoxy resin diluent, a curing agent with a relatively long pot life, and by employing vacuum and/or pressure to effect penetration of the resin into the essentially dry material. Thus, in accord with the invention, a siliceous material is impregnated with an epoxy resin by (1) drying said material to a moisture content below about 5% by weight, (2) impregnating said dried material with a fluid epoxy resin composition by means of vacuum and/or pressure, said resin composition comprising a mixture of an epoxy resin, from about 10 to about 50 parts per one hundred parts of resin of a reactive diluent, and a curing agent which imparts a relatively long pot life, and (3) curing said resin within said material.

As indicated, the invention is applicable to a wide variety of siliceous materials, but is preferably used with hydrated concrete, clay products, and brick and the following discussion will employ concrete as illustrative. It will be understood that any conventional concrete mix of aggregate, sand and cement may be used with the process of the invention and, of course, special mixes are also amenable to improvement by the process. As stated above, the invention requires that the concrete be dried prior to impregnation with the epoxy composition and such drying is readily carried out by conventional techniques. Drying may be done by heating concrete pieces in an oven, external application of heat may be used, or if the concrete contains electrically conducting elements as in reinforced concrete, electrical resistance heating may be used. It is important to reduce the moisture content of the concrete to be treated until it is essentially dry; e.g., to a water content below about 5% by weight. Preferably, the amount of moisture left in the concrete after drying will be from about 1 to about 3%, more preferably of from about 1 to 2% if complete penetration of the concrete is to be achieved.

The epoxy resins used in the invention will be the conventional liquid epoxy resins well known in the art ["Polymer Processes," Schildkneckt, pp. 429-474 (1956)]. Preferably, the reaction product of epichlorohydrin and bisphenol A (e.g., 2,2-bis-(p-hydroxyphenyl)propane will be employed, but other epoxy resins are also useful; e.g., an aliphatic based resin such as the epoxy resin from epichlorohydrin and glycerin (Epon 812, Shell Chemical Co.) and the glycidyl ethers of novalac resins derived from polyhydric phenols by condensation with an aldehyde followed by reaction with epichlorohydrin in the presence of alkali. Other epoxy resins well known in the art and commercially available will also be of value in the invention.

The diluent used in preparing the epoxy resin composition must be a reactive diluent. While penetration of the resin can be achieved when using a non-reactive diluent such as xylene or methyl ethyl ketone, the resulting impregnated concrete will be unstable and subject to dimensional and structural strength changes due to the eventual evaporation of the solvent. Furthermore, loss of solvent may present obnoxious odors and health hazards when the concrete is used in construction for housing, office buildings, hotels and the like where people are present in a confined space.

The reactive diluents used in the invention are known in the art and are characterized by having one or more functional groups (generally epoxy groups) which enter into the reactions occuring during the curing of the epoxy resin. Such diluents are exemplified by styrene oxide, phenyl glycidyl ether, butyl glycidyl ether, octylene oxide, allyl glycidyl ether, 1,2,7,8-diepoxyoctane, the diglycidyl ether of butanediol and the like. Preferably, styrene oxide will be used and the amount of reactive diluent will range from about 10 to about 50 parts per hundred parts of epoxy resin. Less than this amount is generally insufficient to provide a sufficiently low viscosity to enable suitable penetration and more than this amount adversely affects the crosslinking of the resin and results in somewhat lower physical and chemical properties. In general, the amount of diluent used will be from about 15 to 35 parts per hundred parts of resin and this will enable a suitable viscosity (about 50 to 5000 centipoise) for the epoxy resin composition to be obtained (i.e., resin, diluent and curing agent).

Diluents used with epoxy resin formulations generally tend to degrade the physical properties of the cured resin. Furthermore, monofunctional reactive diluents such as styrene oxide tend to inhibit chain building (e.g., cross-linking) and interfere with the development of optimum properties in the resin (see "Epxoy Resins" by Lee and Neville, McGraw Hill, 1957, p. 145). Thus, it is surprising that in the process of this invention, reactive diluents, particularly the monofunctional type, may be used and still obtain a much improved product.

The curing agent to be used in the epoxy composition will, as indicated, be one which enables a fairly long pot life to be achieved since it is necessary to have sufficient working time to get the resin penetrated into the concrete before curing and the attendant thickening occurs. Such slow acting curing agents are known in the epoxy resin art and for the purpose of this invention, will be those conventional curing amine compounds which contain at least one tertiary amine group and not more than one primary amine group. It will be understood that aliphatic, aromatic or heterocyclic tertiary amines may be used such as triethyl amine, benzyldimethyl amine, diethylaminophenol, pyridine and the preferred diethylamino propylamine. These amine curing agents will be used in the usual amounts of from about 5 to 15 parts per one hundred parts of resin and will thereby permit a pot life of at least about one hour for the resin composition which is necessary for sufficient working time to carry out the process. Generally, the pot life of the resin formulation will be from about one to ten hours and this will be adjusted by the amount of curing agent employed (preferably 10 to 15 parts per one hundred parts of resin).

In carrying out the process of the invention, the liquid epoxy composition of epoxy resin, reactive diluent and curing agent are mixed at room temperature and used, also at room temperature, to impregnate the dried concrete. Impregnation, as indicated, is effected either by using vacuum means to draw the liquid epoxy composition into the concrete form by suction, by application of pressure to force the resin composition into the concrete, or by a combination of vacuum and pressure. The particular size and form of the concrete to be treated will determine which technique to employ. The vacuum technique may be carried out by providing one or more channels within the concrete form through which suction is drawn while the outer surfaces of the concrete are covered with the epoxy resin composition. In the pressure technique, the liquid resin formulation is simply forced into the concrete under pressure of air, nitrogen or other inert gas in a closed system. As indicated, combinations of vacuum and pressure are also useful to ensure complete or essentially complete penetration and such systems will be used with concrete of high density and low porosity. It will be understood that depending on size and shape of the concrete to be treated either conventional pressure vessels or especially constructed systems will be used to achieve the necessary vacuum and/or pressure system. Such construction is within the skill of the art.

Prior to impregnation of the resin by applying vacuum or pressure to the dried material as described above, it is necessary, in order to achieve significant penetration, to further remove vaporous materials strongly held in the concrete to be treated. Such entrained materials will be additional moisture not already removed and air present within the pores. Thus, the sample is first placed in a vacuum chamber and vacuum applied until the pressure of the system is reduced to less than about 1000 microns if full loading (e.g., complete impregnation) of the resin is to be achieved. Where less than full loading is desired, a somewhat lower vacuum may be used, but, in general, the material to be treated will be subjected to a vacuum treatment so as to reduce the pressure of the system to 0.5 atmosphere for brick down to about 100 microns for the denser concrete materials. When this pressure level has been achieved, the liquid resin composition is then introduced into the system and either drawn through the material by continued suction or forced in by applied pressure as explained above. When applying pressure, a pressure of up to about 300 psig is required for full loading in a reasonable period of time (e.g., say up to 8 hours).

It will be understood that the time required for impregnation of the resin formulation will depend upon the porosity of the concrete, the desired depth of penetration, the pressure and/or vacuum applied, etc.; but, in general, it will require from about 1 to 6 hours to carry out the impregnation step. After the impregnation has been achieved, curing of the resin is made to occur and this is most readily done by the application of heat. After wiping away any excess resin on the surface of the treated material, heat is applied to the material either by placement of the material in an oven, if possible, or by application of resistance heating or electrical or other type heating mantels to the surface of the object. Curing is generally effected at a temperature between about 70° and about 125°C and complete curing will occur over 1.5 to 5 hours depending on size, thickness, and temperature applied. It will be understood that in some cases, the curing may be carried out in two steps by first gelling (e.g., forming the B-stage resin) and then subjecting the gelled system to a post cure. This two-step technique has the advantage of reducing surface irregularities due to bubbling or any small amount of volatiles during the cure. The impregnated concrete or like material obtained by the invention is characterized by significantly improved physcial properties. In particular the concrete of the invention shows an increase in compressive modulus and compressive strength. Tensile strength as shown by the ASTM splitting tensile strength test is also significantly improved in the concrete of the invention. Furthermore, the epoxy filled concrete has reduced plasticity which makes it of high value for utility for structural use.

After impregnation with the epoxy resin formulation, the concrete takes on a definite grey appearance and it is readily polished to give a terrazzo effect. The filled concrete will have exceedingly long life because of its high strength and chemical inertness.

The concrete of the invention will be filled to at least about 20% of total porosity and this minimum amount is necessary to impart the high degree of corrosion characteristic of the product. In many applications of the process, however, the concrete of the invention will have the epoxy resin distributed essentially throughout the concrete.

As will be seen by the examples which follow, the concrete of the invention is also characterized by having an essentially linear compressive stress-strain curve. This is a highly important property which enables the treated concrete to be a superior construction material.

MATERIALS AND GENERAL PROCEDURES

MATERIALS

All concrete batches were prepared using standard commercially available materials using Portland cement (Type 1) as the binder, and Mountoursville sand and crushed limestone as aggregate.

All concrete batches were prepared using the ACI (American Concrete Institute) method of mix proportioning. Basic batch quantities were calculated on the basis of dry aggregate, then moisture content and absorption are used to determine the adjusted batch quantities. All calculations were based on one cubic yard of concrete, and then scaled down to a 200 lb batch which was used to prepare fifty 3 in. diameter × 6 in. length concrete cylindrical specimens. A commercial liquid entraining agent was added to the mix water in the ratio of 0.75 fl oz per sack of cement.

The coarse aggregate, sand and cement were placed in a rotary mixer and stirred together for 30 seconds. The mix water was then added and the entire batch was mixed for 2 minutes. At the end of this period, the fresh concrete was removed from the mixer, tested for slump and cast into 3 in. × 6 in. wax coated cylindrical cardboard molds (Soiltest Corp., Evanston, Ill.). Concrete was placed in three layers into each mold, tamping each layer 25 times with a ⅝ in. diameter steel rod. The molds were then finished off with a flat edged trowel and then placed in a fog room for 24 hours at 20°C. At the end of this period the molds were stripped from the cylinders which were again placed in a fog room for 28 days to complete the cure.

The liquid epoxy resin composition was formulated with an epoxy resin based on epichlorohydrin and bisphenol A commercially available from Shell Chemical Co. as Epon[R] 828. This resin has an average molecular weight of about 380 and a viscosity of 10,000 to 16,000 cp at 25°C. The curing agent used was diethylaminopropylamine (12.5 parts per one hundred parts of resin) and the reactive diluent employed was styrene oxide in an amount of 25 parts per one hundred parts of epoxy resin.

APPARATUS

The impregnation apparatus consisted of a cylindrical pressure chamber (6 in. diameter × 10 in. length) fitted with a gasketed removable top plate having three valved lines to the chamber, one acting as a vacuum line, another as a pressure line and the third as a resin input line. The bottom of the chamber was fitted with a retaining ring to hold the concrete sample in a cylindrical can (3¼ in. × 7½ in.) capped with an inverted funnel. The can is slightly larger in diameter than the cylindrical concrete sample so that it fits loosely over the sample. A feed line for the liquid resin formulation was attached to an inlet at one side of the inverted funnel on the open cylinder, the other end of the feed line being attached to the internal end of one of the valved inputs at the top of the pressure chamber which is also fitted externally with a funnel to act as a reservoir for feeding the resin formulation into the chamber.

PROCEDURE

For impregnation, the samples are removed from the fog room and placed in a large forced draft oven at 115°C for 72 hours. They are then transferred to a small vacuum oven and further dried at 110°C for 24 hours while continuously pumping out all residual water. They are then allowed to cool to room temperature while still under vacuum. By using this procedure, the concrete is thoroughly dry before impregnation is started. If drying is not done, some water will remain and will retard the flow of monomer through the sample, thus causing irregular penetration and attendant structural weakness within the material.

The cooled concrete sample is removed from the vacuum oven and weighed. It is then placed into the cylindrical can having its top capped with an inverted funnel to contain any resin which might spatter as the mix enters the evacuated chamber. The can with the concrete sample inside it is inserted into the retaining ring in the chamber. The top plate of the chamber is then fastened securely. The resin reservoir, hoses, and a thermocouple gauge for pressure determination are then attached, making sure both vacuum and pressure valves are closed. The vacuum valve is opened, and the chamber is evacuated down to 100 microns.

At this stage the epoxy mix is prepared. This is done by weighing out the required amounts of resin, diluent, and curing agent into a large (~20 oz) wax coated paper cup, mixing for 2 minutes, and then evacuating in a vacuum oven until the entrapped air bubbles are removed. The mix is then transferred to the resin reservoir. The vacuum pump is shut off and the resin fed to the pressure chamber. Before all the resin has left the funnel, the feed is stopped to prevent splattering by air drawn in after the resin. After approximately one minute the pressure valve is opened and the chamber is brought up to atmospheric pressure with air. The top plate of the chamber is then removed, the inverted funnel removed from the can, and any resin which has splattered is wiped off. The chamber is then reassembled, the resin reservoir is removed and the orifice is sealed by a stainless steel/copper disc type plug. The vacuum valve is closed and the system is brought up to the predetermined pressure with compressed nitrogen. At the end of the time period for pressurization, the can is removed from the chamber. Excess resin is poured off, and the sides of the sample are wiped off with a paper towel. The cylinder is weighed and allowed to stand at room temperature overnight during which time a B-stage cure occurred. Then the sample is placed in an oven at 75°C overnight to effect the final cure. After cooling to room temperature, the sample is ready to be tested.

Porosity of the control samples was determined by a water saturation technique. Three samples from a given batch were dried, weighed, and placed in a large capacity impregnation chamber. The chamber was evacuated to 100 $\mu$m, and sufficient water to cover the samples was then allowed to flow in. The chamber was then pressurized to 75 psig for 24 hours. Following this the samples were removed from the water and immediately reweighed. Assuming the density of water to be 1.0 gm/cc, the porosity was calculated as $$\% \text{ porosity} = \frac{\text{volume water absorbed (cc)}}{\text{bulk volume sample (cc)}} \times 100$$

Bulk volume of the 3 in. × 6 in. samples was found to be about 690 cc. Porosity of the impregnated samples was determined by reweighing the samples after impregnation and, using the density of the cured resin (1.16 gm/cc), calculating the volume occupied by resin. By converting this to percent of bulk volume occupied and subtracting this figure from the total porosity, the remaining porosity of the impreganted samples is determined. Experimental tests have shown that less than 0.1% of the water used for this porosity test is retained in the concrete sample.

EXAMPLES AND DATA

EXAMPLE 1

The data obtained by the above experimental procedures are shown in the following tables. Table I shows the results with a concrete mix where the w/c ratio (water to cement ratio) is 0.4. In Table II, it is 0.6 and in Table III it is 0.8.

TABLE I

| Sample | Applied Pressure (psig) | Immersion Time (hrs) | Loading wt % | Loading vol % | Porosity % | Compressive Modulus (psi × $10^{-6}$) Run 1 | Compressive Modulus (psi × $10^{-6}$) Run 2 | Compressive Strength psi |
|---|---|---|---|---|---|---|---|---|
| Water:Cement Ratio = 0.4 | | | | | | | | |
| AC-4 Control | — | — | — | — | 16.10 | 1.79 | 1.79 | 5240 |
| AC-5 Control | — | — | — | — | 16.10 | 2.83 | 3.34 | 5820 |
| AC-6 Control | — | — | — | — | 16.10 | 1.68 | 2.52 | 4890 |
| AP-1 | $0^{(a)}$ | 3 | 2.52 | 4.97 | 11.00 | 2.83 | 3.31 | 8400 |
| AP-11 | 25 | 3 | 4.07 | 8.00 | 8.10 | — | — | 12220 |
| AP-10 | 30 | 3 | 3.34 | 6.55 | 9.55 | 2.49 | 2.70 | 8400 |
| AP-2 | 50 | 3 | 4.27 | 8.31 | 7.79 | 2.99 | 3.96 | 10450 |
| AP-3 | 100 | 3 | 5.57 | 10.80 | 5.30 | 3.80 | 3.85 | 13840 |
| AP-8 | 100 | 3 | 4.94 | 9.65 | 6.45 | 3.71 | 3.73 | 11650 |
| AP-4 | 200 | 3 | 5.20 | 10.00 | 6.10 | 4.22 | 4.49 | 12640 |
| AP-5 | 200 | 5 | 5.70 | 11.30 | 4.80 | 5.04 | 5.29 | 17940 |
| AP-6 | 200 | 6 | 6.07 | 11.80 | 4.30 | 4.63 | 5.12 | 18290 |

$^{(a)}$no external pressure

TABLE II

| Sample | Applied Pressure (psig) | Immersion Time (hrs) | Loading wt % | Loading vol % | Porosity % | Compressive Modulus (psi × $10^{-6}$) Run 1 | Compressive Modulus (psi × $10^{-6}$) Run 2 | Compressive Strength psi |
|---|---|---|---|---|---|---|---|---|
| Water:Cement Ratio = 0.6 | | | | | | | | |
| BC-7 Control | — | — | — | — | 17.50 | 1.39 | 2.12 | 4320 |
| BC-8 Control | — | — | — | — | 17.50 | 0.95 | 1.63 | 3770 |
| BC-9 Control | — | — | — | — | 17.50 | 2.17 | 2.28 | 3830 |
| BP-8 | $0^{(a)}$ | 1 | 2.00 | 3.87 | 13.60 | 2.40 | 2.91 | 4940 |
| BP-9 | $0^{(a)}$ | 1 | 2.24 | 4.31 | 13.20 | 1.66 | 2.04 | 5720 |
| BP-7 | $0^{(a)}$ | 3 | 2.66 | 5.14 | 12.40 | 2.64 | 3.14 | 6360 |
| BP-6 | $0^{(a)}$ | 3 | 2.92 | 5.65 | 11.90 | 3.03 | 3.10 | 6990 |
| BP-11 | 50 | 3 | 3.66 | 6.91 | 10.60 | 2.89 | 3.28 | 7060 |
| BP-10 | 50 | 3 | 3.69 | 7.09 | 10.40 | 3.08 | 3.11 | 8550 |
| BP-1 | 73 | 3 | 4.88 | 9.40 | 8.10 | 3.35 | 3.41 | 10950 |
| BP-12 | 120 | 3 | 5.06 | 9.73 | 7.77 | 3.32 | 3.64 | 9960 |
| BP-13 | 200 | 3 | 4.96 | 9.52 | 7.98 | 3.20 | 3.71 | 10800 |
| BP-15 | 200 | 3 | 5.68 | 11.00 | 6.50 | 3.91 | 4.19 | 13200 |
| BP-14 | 200 | 3 | 5.32 | 10.10 | 7.40 | 3.36 | 3.67 | 10870 |
| BP-16 | 200 | 5 | 6.41 | 12.50 | 5.00 | 4.18 | 4.04 | 14260 |
| BP-5 | 245 | 7.25 | 5.95 | 11.50 | 6.00 | 3.36 | 3.70 | 13060 |

$^{(a)}$no external pressure

TABLE III

| Sample | Applied Pressure (psig) | Immersion Time (hrs) | Loading wt % | Loading vol % | Porosity % | Compressive Modulus (psi × $10^{-6}$) Run 1 | Compressive Modulus (psi × $10^{-6}$) Run 2 | Compressive Strength psi |
|---|---|---|---|---|---|---|---|---|
| Water:Cement Ratio = 0.8 | | | | | | | | |
| CC-1 Control | — | — | — | — | 18.70 | 0.697 | 1.50 | 2430 |
| CC-2 Control | — | — | — | — | 18.70 | 0.771 | 1.34 | 2290 |
| CC-3 Control | — | — | — | — | 18.70 | 1.190 | 1.06 | 2320 |
| CP-3 | $0^{(a)}$ | 0.1 | 2.02 | 3.80 | 14.90 | 1.650 | 1.83 | 3740 |
| CP-6 | $0^{(a)}$ | 0.1 | 1.43 | 2.67 | 16.00 | 1.500 | 1.75 | 3530 |
| CP-2 | $0^{(a)}$ | 0.5 | 3.22 | 6.17 | 12.50 | 1.150 | 1.41 | 4100 |
| CP-7 | $0^{(a)}$ | 0.5 | 3.07 | 5.84 | 12.90 | 1.700 | 1.63 | 4030 |
| CP-1 | $0^{(a)}$ | 1.5 | 4.14 | 7.73 | 11.00 | 2.170 | 2.34 | 6000 |
| CP-4 | $0^{(a)}$ | 3.0 | 4.00 | 7.57 | 11.10 | 1.990 | 2.27 | 5860 |
| CP-11 | 30 | 3.0 | 4.78 | 9.10 | 9.60 | 3.280 | 3.19 | 8120 |
| CP-9 | 60 | 3.0 | 5.34 | 10.10 | 8.60 | 3.360 | 3.26 | 8620 |
| CP-10 | 60 | 3.0 | 5.67 | 10.60 | 8.10 | 3.460 | 3.44 | 8400 |
| CP-8 | 120 | 3.0 | 6.00 | 11.30 | 7.40 | 3.430 | 4.00 | 8900 |
| CP-12 | 200 | 3.0 | 7.45 | 14.20 | 4.50 | 3.390 | 3.68 | 15470 |

TABLE III-continued

| Sample | Applied Pressure (psig) | Immersion Time (hrs) | Loading | | Porosity % | Compressive Modulus (psi × 10⁻⁶) | | Compressive Strength psi |
|---|---|---|---|---|---|---|---|---|
| | | | wt % | vol % | | Run 1 | Run 2 | |
| CP-13 | 200 | 3.0 | 6.44 | 12.10 | 6.60 | 3.320 | 3.64 | 10240 |

$^{(a)}$no external pressure

EXAMPLE 2

In another set of experiments, concrete cylinders prepared as above were subjected to impregnation with Epon 828 as in the previous experiments but using various reactive diluents.

| Reactive Diluent | Loading (vol %) | Compressive Strength (psi) |
|---|---|---|
| 1,2,7,8-Diepoxy-octane | 9.9 | 15,607 |
| Diglycidyl ether of butane diol | 7.5 | 12,712 |
| Allyl glycidyl ethyl | 11.8 | 9,181 (Bad cylinder cap) |

It is clear from the above data that significant improvement in strength was obtained in each case since an untreated concrete cylinder has a compressive strength of about 4000 psi.

EXAMPLE 3

A concrete cylinder prepared as above was soaked for six hours in an epoxy formulation of 25 parts of styrene oxide and 12.5 parts of diethylaminopropylamine per 100 parts of epoxy resin. Penetration was observed to be 0.125 inches and the volume loading was determined to be only 1.4%. Compressive strength of the cured sample was 5580 psi thus indicating that a simple soaking or spraying procedure without the use of pressure or vacuum for impregnation does not give substantial penetration or a significantly improved product.

EXAMPLE 4

Two samples prepared as described above and having a loading of 12.7% and 15.3% by volume respectively and a porosity of 6.0 and 3.4 respectively, together with a control were subjected to a standard compressive stress-strain test for concrete. The results of this test are shown in the curves of the FIGURE. It is evident that the control sample gives a typical curve which is non-linear showing considerable plastic flow and typical breaking strength. On the other hand, the experimental samples show a somewhat higher slope (e.g., higher Young's modulus), a much more linear curve and a much high compressive strength. It is clear to the concrete art worker that the filled samples will be a superior product for structural workers.

EXAMPLE 5

Extruded building bricks with a porosity of about 20% were treated with epoxy resin as described above. The bricks were filled to about 20% of the total volume porosity with the resin and on testing, fracture strength parallel to direction of extrusion was increased to over 3.75 times the strength of the control. In addition, the fracture strength perpendicular to the direction of extrusion was increased about 4.6 times. Water uptake of the treated brick was found to be essentially zero. Molded brick treated with epoxy resin also showed an average increase in fracture strength of about three times and porosity was reduced to less than 1%.

The invention claimed is:

1. A high strength, chemically inert, cured concrete composition of reduced porosity consisting essentially of concrete and an epoxy resin composition distributed essentially completely through said concrete composition, said concrete composition having a porosity of from about 4 to about 11% and said epoxy resin composition being obtained by curing in situ in a concrete previously dried to a moisture level of from about 1 to about 3% by weight a composition consisting essentially of a mixture of epoxy resin obtained by condensation of epichlorohydrin with a bisphenol or glycerine, from about 15 to about 35 parts per one hundred parts of resin of a reactive diluent for epoxy resins selected from the group consisting of styrene oxide, phenyl glycidyl ether, butyl glycidyl ether, octylene oxide, allyl glycidyl ether, 1,2,7,8-diepoxyoctane, and the diglycidyl ether of butanediol, and a curing agent with a long pot life selected from the group of aliphatic, aromatic and heterocyclic tertiary amines containing not more than one primary amine group.

2. The concrete composition of claim 1 where the epoxy resin is obtained by condensation of epichlorohydrin with a bisphenol.

3. The concrete composition of claim 1 where the epoxy resin is obtained by condensation of epichlorohydrin with bisphenol A, the reactive diluent is styrene oxide, and the curing agent is diethylamino propylamine.

4. The concrete composition of claim 2 where the porosity is from about 4 to about 6%.

5. The concrete composition of claim 3 where the porosity is from about 4 to about 6%.

* * * * *